(12) United States Patent
Park

(10) Patent No.: US 11,268,574 B2
(45) Date of Patent: Mar. 8, 2022

(54) SEAL ASSEMBLY FOR WHEEL BEARING

(71) Applicants: HYUNDAI MOTOR COMPANY, Seoul (KR); KIA MOTORS CORPORATION, Seoul (KR)

(72) Inventor: Yong Han Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 148 days.

(21) Appl. No.: 16/673,314

(22) Filed: Nov. 4, 2019

(65) Prior Publication Data

US 2020/0158178 A1     May 21, 2020

(30) Foreign Application Priority Data

Nov. 20, 2018  (KR) .......................... 10-2018-0143882

(51) Int. Cl.
  *F16C 33/76*     (2006.01)
  *F16C 19/18*     (2006.01)
(52) U.S. Cl.
  CPC ............ *F16C 33/76* (2013.01); *F16C 19/184* (2013.01); *F16C 2326/02* (2013.01)
(58) Field of Classification Search
  CPC .......... F16C 33/00; F16C 33/76; F16C 33/72; F16C 33/723; F16C 33/748; F16C 33/763; F16C 33/7816; F16C 33/782; F16C 33/7823; F16C 33/7853; F16C 33/7866; F16C 33/7876; F16C 33/7879; F16C 33/7886; F16C 33/80; F16C 33/761; F16C 33/805; F16C 19/00; F16C 19/18; F16C 19/184; F16C 19/185; F16C 2326/086; F16C 2326/088

USPC .......................................................... 277/349
See application file for complete search history.

(56) References Cited

U.S. PATENT DOCUMENTS

| | | | | |
|---|---|---|---|---|
| 5,096,207 A | * | 3/1992 | Seeh ..................... | F16J 15/3256 277/353 |
| 5,211,406 A | * | 5/1993 | Katzensteiner ...... | F16J 15/3256 277/351 |
| 6,450,503 B1 | * | 9/2002 | Dossena ............... | F16J 15/3256 277/549 |
| 2005/0089254 A1 | | 4/2005 | Takehara et al. | |
| 2011/0188791 A1 | | 8/2011 | Proeschel | |

FOREIGN PATENT DOCUMENTS

| | | |
|---|---|---|
| JP | H07-26609 Y2 | 6/1995 |
| JP | 2009-204012 A | 9/2009 |
| JP | 2014-75879 A | 4/2014 |
| KR | 10-2012-0055977 A | 6/2012 |
| KR | 10-2013-0055861 A | 5/2013 |

* cited by examiner

*Primary Examiner* — Nathan Cumar
(74) *Attorney, Agent, or Firm* — Morgan, Lewis & Bockius LLP

(57) ABSTRACT

A seal assembly for a wheel bearing, may include a core facing an internal side of a wheel bearing assembly; a slinger disposed to face an external side of the wheel bearing assembly; a sealing member fixed to the core, and having a plurality of sealing lips selectively pressed against the slinger; and a deformation unit including a first spring and a second spring mounted on the slinger, and allowing the slinger to deform according to a vehicle speed, wherein the first spring and the second spring are disposed to be parallel to each other.

16 Claims, 5 Drawing Sheets

SEAL ASSEMBLY FOR WHEEL BEARING

CROSS-REFERENCE TO RELATED APPLICATION

The present application claims priority to Korean Patent Application No. 10-2018-0143882, filed on Nov. 20, 2018, the entire contents of which is incorporated herein for all purposes by this reference.

BACKGROUND OF THE INVENTION

Field of the Invention

The present invention relates to a seal assembly for a wheel bearing, and more particularly, to a seal assembly for a wheel bearing, capable of allowing a seal structure to vary or be deformed according to a vehicle speed, thereby ensuring sealing performance at low speeds, and improving fuel economy at high speeds.

Description of Related Art

A wheel bearing assembly for a vehicle is used to rotatably mount the wheels on a vehicle.

The wheel bearing assembly may include a wheel hub, an internal race disposed on the external surface of the wheel hub, an external race disposed at the outside of the internal race, and a plurality of rolling elements located between the internal race and the external race. The wheel bearing assembly may include a seal assembly that prevents a foreign object from entering the rolling elements.

The seal assembly may include an annular sealing plate disposed between the internal race and the external race, and a sealing member having a plurality of sealing lips pressed against the sealing plate.

However, as the plurality of sealing lips are pressed against the sealing plate, a frictional force between the sealing lips and the sealing plate increases. Thus, the seal assembly acts as a resistance under a high-speed driving condition of the vehicle, lowering fuel economy.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a seal assembly for a wheel bearing, configured for allowing a seal structure to vary according to a vehicle speed, ensuring sealing performance at low speeds, and improving fuel economy at high speeds.

According to various aspects of the present invention, a seal assembly for a wheel bearing may include: a metal core facing an internal side of a wheel bearing assembly; a slinger disposed to face an external side of the wheel bearing assembly; a sealing member fixed to the metal core, and having a plurality of sealing lips selectively pressed against the slinger; and a deformation unit including a first spring and a second spring mounted on the slinger, and allowing the slinger to deform according to a vehicle speed, wherein the first spring and the second spring may be disposed to be parallel to each other.

The first spring and the second spring may be made of materials having different stiffness.

A length change rate of the first spring and a length change rate of the second spring may be set differently.

The metal core may include an external cylindrical portion which is fitted to an external race of the wheel bearing assembly, and an external ring portion which extends radially from the external cylindrical portion.

The slinger may include an internal cylindrical portion which is fitted to an internal race of the wheel bearing assembly, an internal ring portion which extends radially from the internal cylindrical portion, and an offset portion which is offset with respect to the internal ring portion toward the internal side of the wheel bearing assembly.

The sealing member may include a first sealing lip pressed against the internal cylindrical portion of the slinger, a second sealing lip pressed against the internal ring portion of the slinger, and a third sealing lip pressed against the offset portion of the slinger.

The first spring and the second spring may be disposed between the internal cylindrical portion and the internal ring portion, and the first spring and the second spring may be parallel to each other in a longitudinal direction of the internal ring portion.

The first spring may be positioned to face the internal side of the wheel bearing assembly, and the second spring may be positioned to face the external side of the wheel bearing assembly.

The first spring may be made of a material having a lower transverse elastic modulus than that of the second spring.

A wire diameter of the first spring may be thinner than a wire diameter of the second spring.

An external diameter of the first spring may be greater than an external diameter of the second spring.

The number of turns of coil in the first spring may be greater than the number of turns of coil in the second spring.

The deformation unit may further include first and second dust covers preventing a foreign object from entering the first spring and the second spring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
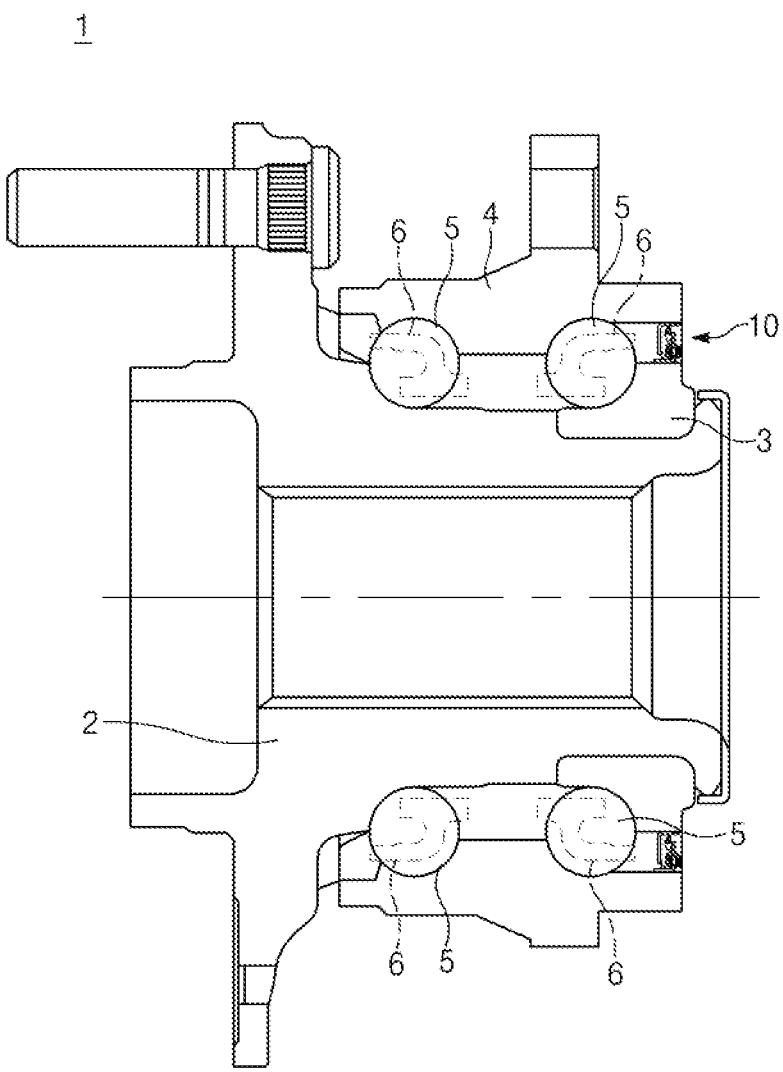
FIG. 1 illustrates a cross-sectional view of a wheel bearing according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a wheel bearing assembly 1 may include a wheel hub 2, an internal race 3 disposed on the external surface of the wheel hub 2, an external race 4 spaced from the internal race 3 in an external diameter direction thereof, and a plurality of rolling elements 5 disposed between the internal race 3 and the external race 4. Each rolling element 5 may be supported by a cage 6.

The wheel bearing assembly 1 may include a seal assembly 10 that prevents the entry of a foreign object.

The seal assembly 10 may include a metal core 11 facing the internal side of the wheel bearing assembly 1, a slinger 12 facing the external side of the wheel bearing assembly 1, and a sealing member 13 fixed to the metal core 11.

The metal core 11 includes an external cylindrical portion 21 which is fitted to the internal surface of the external race 4, and an external ring portion 22 which extends radially inwardly from the external cylindrical portion 21.

The external cylindrical portion 21 may extend in a longitudinal direction of the wheel bearing assembly 1, and the external ring portion 22 may extend in a radial direction of the wheel bearing assembly 1.

The metal core 11 further includes a protrusion 27 fitted into a receiving groove 35 of the sealing member 13.

The slinger 12 includes an internal cylindrical portion 23 which is fitted to the external surface of the internal race 3, an internal ring portion 24 which extends from the internal cylindrical portion 23 in an external diameter direction thereof, and an offset portion 25 which is offset with respect to the internal ring portion 24 toward the internal side of the wheel bearing assembly 1.

The internal cylindrical portion 23 may extend in the longitudinal direction of the wheel bearing assembly 1, and the internal ring portion 24 and the offset portion 25 may extend in the radial direction of the wheel bearing assembly 1.

The sealing member 13 may be made of a resilient material, for example, an elastomer such as rubber. The sealing member 13 may be fixed to the metal core 11 by insert injection molding or the like.

The sealing member 13 may have a plurality of sealing lips 31, 32, and 33. The plurality of sealing lips 31, 32, and 33 may include a first sealing lip 31 pressed against the internal cylindrical portion 23 of the slinger 12, a second sealing lip 32 pressed against the internal ring portion 24 of the slinger 12, and a third sealing lip 33 pressed against the offset portion 25 of the slinger 12.

The metal core 11 may be positioned to face the internal side of the wheel bearing assembly 1, and the slinger 12 may be positioned to face the external side of the wheel bearing assembly 1. The sealing member 13 may be positioned between the metal core 11 and the slinger 12.

The seal assembly 10 according to an exemplary embodiment of the present invention may include a deformation unit 40 allowing the deformation of the slinger 12 as a vehicle speed changes.

The deformation unit 40 may include a first spring 41 and a second spring 42 mounted on the slinger 12.

The first spring 41 and the second spring 42 may be disposed between the internal cylindrical portion 23 and the internal ring portion 24 of the slinger 12, and the first spring 41 and the second spring 42 may be disposed to be parallel to each other in a longitudinal direction of the internal ring portion 24.

The first spring 41 may be positioned to face the internal side of the wheel bearing assembly 1, and the second spring 42 may be positioned to face the external side of the wheel bearing assembly 1.

The internal ring portion 24 may be provided with an upper connecting portion 24a, and a top end portion of the first spring 41 and a top end portion of the second spring 42 may be connected to the upper connecting portion 24a. The internal cylindrical portion 23 may be provided with a lower connecting portion 23a, and a bottom end portion of the first spring 41 and a bottom end portion of the second spring 42 may be connected to the lower connecting portion 23a.

The plurality of first springs 41 and the plurality of second springs 42 may be disposed between the internal cylindrical portion 23 and the internal ring portion 24 in a circumferential direction thereof.

The first spring 41 and the second spring 42 may have different spring stiffness.

The spring stiffness K may be expressed by the following equation (1):

$$K = Gd^n/8NaD3 \qquad \text{Equation (1)}$$

Here, K is spring stiffness, G is transverse elastic modulus, d is spring wire diameter, n is the number of turns of coil, and D is spring external diameter.

According to an exemplary embodiment of the present invention, the spring stiffness of the first spring 41 may be less than the spring stiffness of the second spring 42. Thus, when a force due to a change in vehicle speed is applied to the deformation unit 40, a length change rate of the first spring 41 may be greater than a length change rate of the second spring 42.

According to an exemplary embodiment of the present invention, the first spring 41 may be made of a material having a lower transverse elastic modulus than that of the second spring 42. For example, the first spring 41 may be made of SUS stainless steel wire, brass wire, or the like, and the second spring 42 may be made of spring steel or the like.

According to another exemplary embodiment of the present invention, a wire diameter d1 of the first spring 41 may be thinner than a wire diameter d2 of the second spring 42.

According to another exemplary embodiment of the present invention, an external diameter D1 of the first spring 41 may be greater than an external diameter D2 of the second spring 42.

According to another exemplary embodiment of the present invention, the number of turns of coil in the first spring 41 may be greater than the number of turns of coil in the second spring 42.

The deformation unit 40 may further include first and second dust covers 43 and 44 preventing a foreign object from entering the first spring 41 and the second spring 42.

The first dust cover 43 may be fitted to the internal cylindrical portion 23 and the internal ring portion 24 to cover the first spring 41. The first dust cover 43 may have a pair of first grooves 45 formed in top and bottom end portions thereof, respectively, and the slinger 12 may have a pair of first protrusions 46 corresponding to the pair of first grooves 45. The pair of first grooves 45 may be fitted to the pair of first protrusions 46, respectively. An external diameter of the first protrusion 46 may be slightly greater than an internal diameter of the first groove 45. Thus, the first grooves 45 of the first dust cover 43 may be press-fit into the first protrusions 46 of the slinger 12, respectively.

The second dust cover 44 may be fitted to the internal cylindrical portion 23 and the internal ring portion 24 to cover the second spring 42. The second dust cover 44 may have a pair of second grooves 47 formed in top and bottom end portions thereof, respectively, and the slinger 12 may have a pair of second protrusions 48 corresponding to the pair of second grooves 47. An external diameter of the second protrusion 48 may be slightly greater than an internal diameter of the second groove 47. Thus, the second grooves 47 of the second dust cover 44 may be press-fit into the second protrusions 48 of the slinger 12, respectively.

In the seal assembly 10 according to exemplary embodiments of the present invention, the deformation unit 40 may be deformed by a force generated in the longitudinal direction of the wheel bearing assembly 1 according to the vehicle speed.

Figure 2:
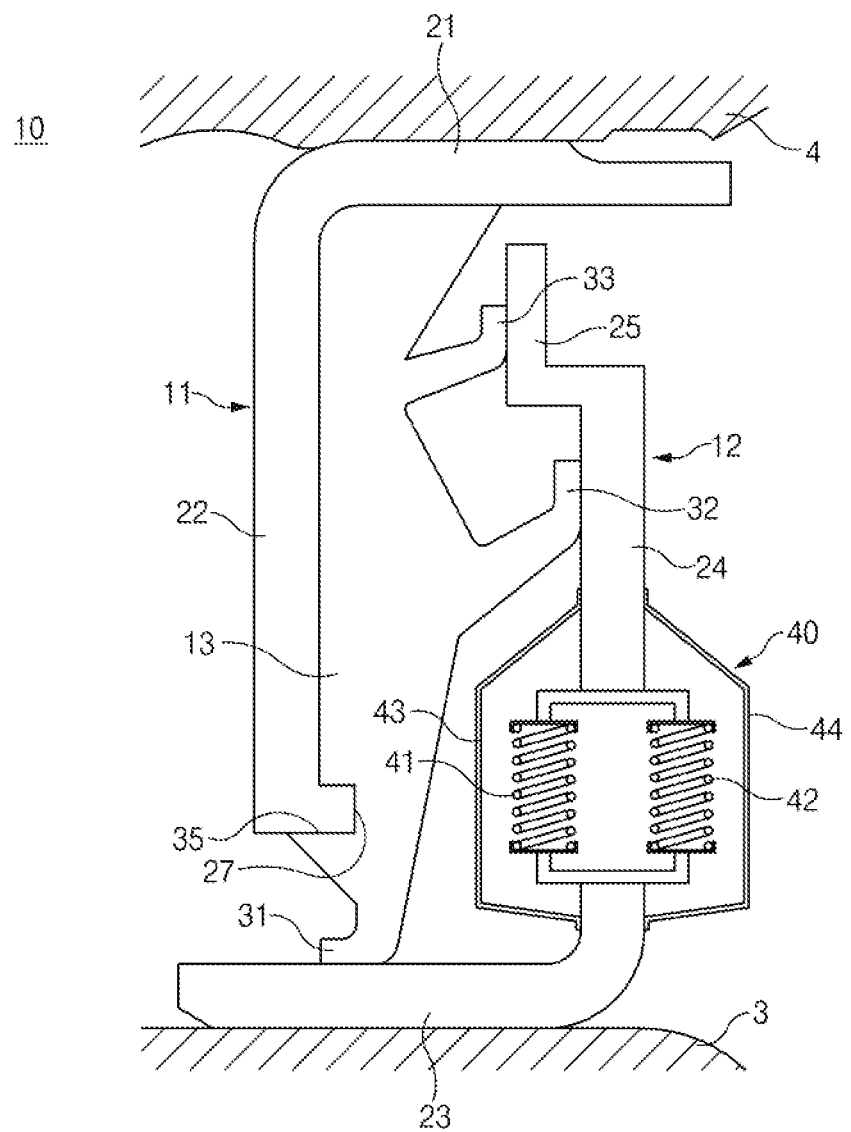
FIG. 2 illustrates a cross-sectional view of a seal assembly for a wheel bearing according to an exemplary embodiment of the present invention, in a state in which a deformation unit in the seal assembly is not deformed under a low-speed driving condition.
Figure 3:
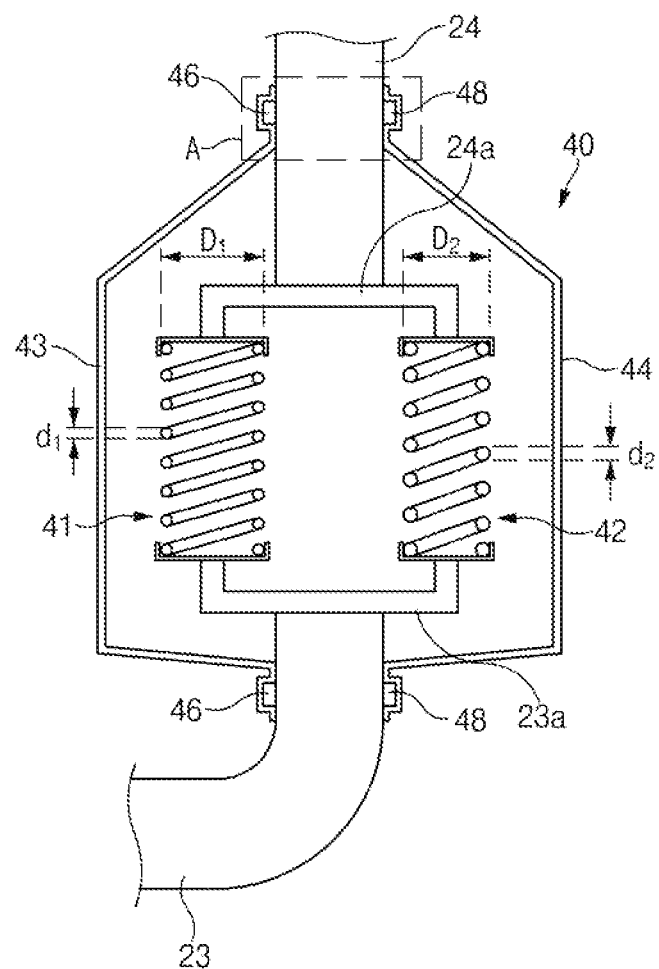
FIG. 3 illustrates details of a deformation unit in a seal assembly for a wheel bearing according to an exemplary embodiment of the present invention.
Figure 4:
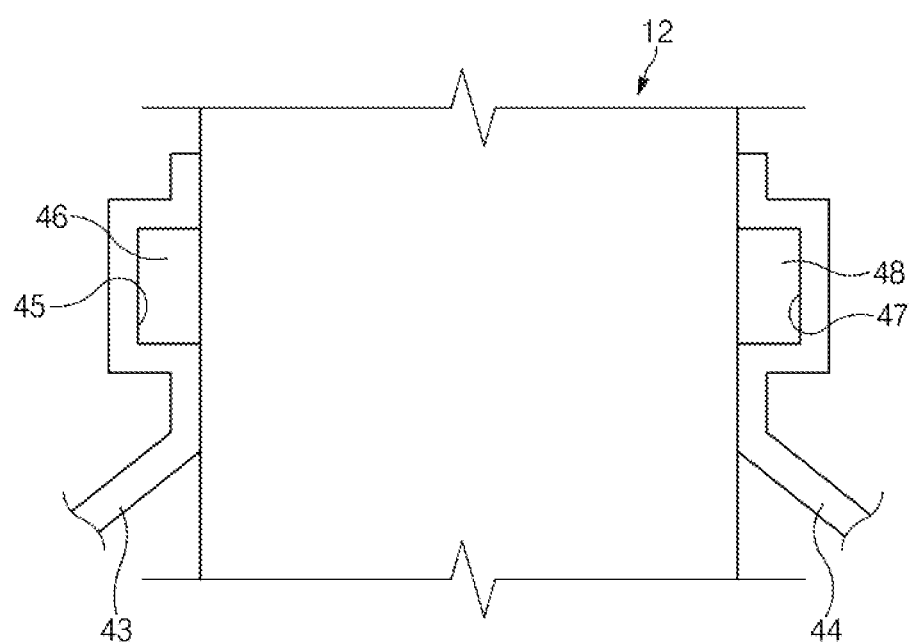
FIG. 4 illustrates an enlarged view of portion an in FIG. 3.

When the vehicle speed is low, a force may hardly be generated in the longitudinal direction of the wheel bearing assembly 1, and thus the first spring 41 and the second spring 42 of the deformation unit 40 may remain parallel to each other. As illustrated in FIG. 2, since the deformation unit 40 and the internal ring portion 24 and the offset portion 25 connected to the deformation unit 40 are flattened (or straightened) along the radial direction of the wheel bearing assembly 1, the first sealing lip 31 of the sealing member 13 may be pressed against the internal cylindrical portion 23 of the slinger 12, the second sealing lip 32 of the sealing member 13 may be pressed against the internal ring portion 24 of the slinger 12, and the third sealing lip 33 of the sealing member 13 may be pressed against the offset portion 25 of the slinger 12. That is, in the low-speed condition of the vehicle, the plurality of sealing lips 31, 32, and 33 may be pressed against the slinger 12, ensuring sufficient sealing performance.

Figure 5:
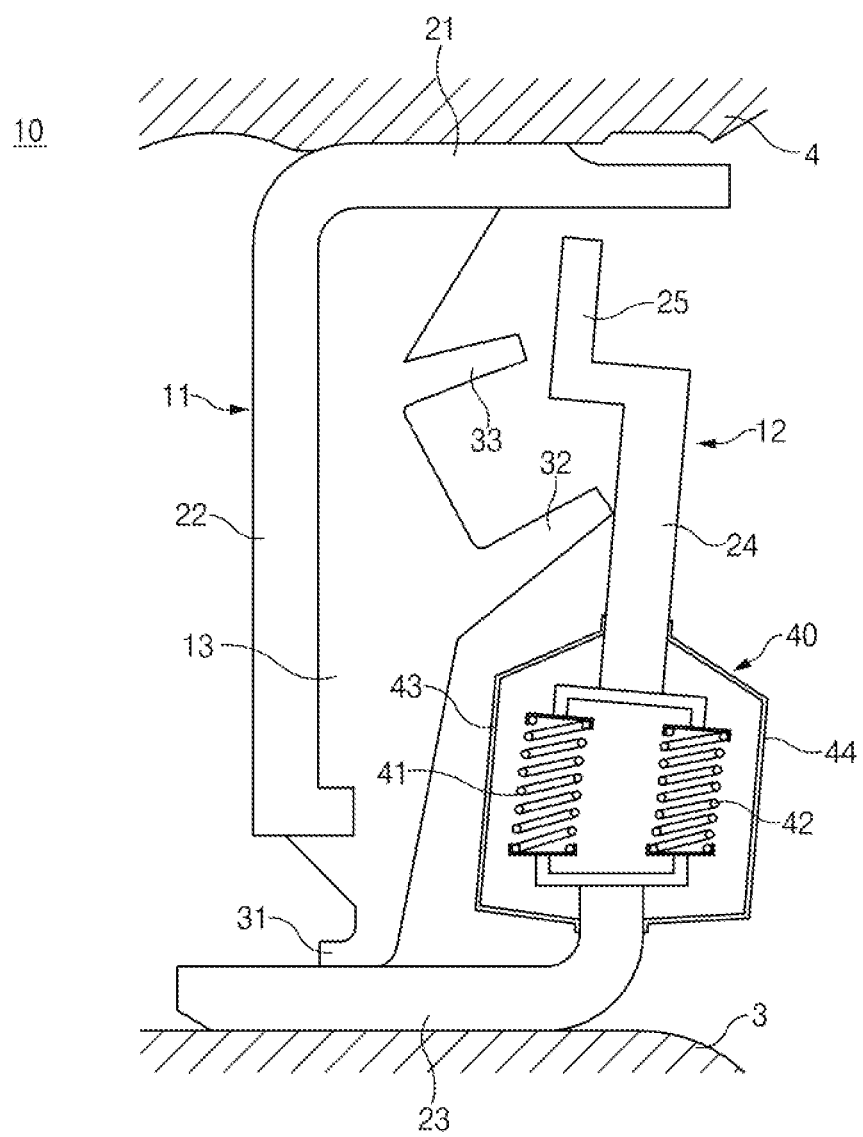
FIG. 5 illustrates a cross-sectional view of a seal assembly for a wheel bearing according to an exemplary embodiment of the present invention, in a state in which a deformation unit in the seal assembly is deformed under a high-speed driving condition.

When the vehicle speed is high, a force such as a centrifugal force may be generated in the longitudinal direction of the wheel bearing assembly 1. Since the spring stiffness of the first spring 41 is less than that of the second spring 42, the length change rate of the first spring 41 is greater than that of the second spring 42. Thus, as illustrated in FIG. 5, the deformation unit 40 and the internal ring portion 24 and the offset portion 25 connected to the deformation unit 40 may be deformed (bent) toward the external side of the wheel bearing assembly 1. As the internal ring portion 24 and the offset portion 25 of the slinger 12 are deformed toward the external side of the wheel bearing assembly 1, the second sealing lip 32 of the sealing member 13 may be separated from the internal ring portion 24 of the slinger 12, and the third sealing lip 33 of the sealing member 13 may be separated from the offset portion 25 of the slinger 12. That is, in the high-speed condition of the vehicle, some sealing lips 32 and 33 of the sealing member 13 may be separated from the slinger 12 due to deformation of the deformation unit 40, relatively reducing a frictional force thereof. By minimizing the drag of the vehicle while the vehicle is driving, the fuel economy of the vehicle may be improved.

As set forth above, the seal assembly for a wheel bearing, according to exemplary embodiments of the present invention, may allow a seal structure to vary according to a vehicle speed, ensuring sealing performance at low speeds, and improving fuel economy at high speeds.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A seal assembly for a wheel bearing, the seal assembly comprising:
   a core facing an internal side of a wheel bearing assembly;
   a slinger disposed to face an external side of the wheel bearing assembly;
   a sealing member fixed to the core, and having a plurality of sealing lips selectively pressed against the slinger; and
   a deformation unit coupled to the slinger and including a first elastic member and a second elastic member mounted on the slinger, the deformation unit being configured to allow the slinger to deform according to a vehicle speed, wherein the first elastic member and the second elastic member are mounted to be in parallel to each other, and wherein the first elastic member and the second elastic member are made of materials having stiffness different from each other.

2. The seal assembly according to claim 1, wherein a length change rate of the first elastic member and a length change rate of the second elastic member are set differently.

3. The seal assembly according to claim 1, wherein the core includes:

an external cylindrical portion which is fitted to an external race of the wheel bearing assembly; and an external ring portion which extends from the external cylindrical portion in a radial direction of the wheel bearing assembly.

4. The seal assembly according to claim 3, wherein the core further includes a protrusion extending from an end portion of the external ring portion, and wherein the sealing member includes a receiving groove into which the protrusion of the core is fitted into.

5. The seal assembly according to claim 3, wherein the slinger includes:

an internal cylindrical portion which is fitted to an internal race of the wheel bearing assembly;

an internal ring portion which extends from the internal cylindrical portion in the radial direction of the wheel bearing assembly; and an offset portion which is offset with respect to the internal ring portion toward the internal side of the wheel bearing assembly.

6. The seal assembly according to claim 5, wherein the first elastic member and the second elastic member are mounted between the internal cylindrical portion and the internal ring portion, wherein a first end portion of the first elastic member and a first end portion of the second elastic member are connected to the internal ring portion by an upper connecting portion connected to the internal ring portion, and wherein a second end portion of the first elastic member and a second end portion of the second elastic member are connected to the internal cylindrical portion by a lower connecting portion connected to the internal cylindrical portion.

7. The seal assembly according to claim 5, wherein the sealing member includes:

a first sealing lip pressed against the internal cylindrical portion of the slinger;

a second sealing lip selectively pressed against the internal ring portion of the slinger; and a third sealing lip selectively pressed against the offset portion of the slinger.

8. The seal assembly according to claim 7, wherein the first elastic member and the second elastic member are mounted between the internal cylindrical portion and the internal ring portion, and the first elastic member and the second elastic member are in parallel to each other in a longitudinal direction of the internal ring portion.

9. The seal assembly according to claim 8, wherein the first elastic member is made of a material having a transverse elastic modulus lower than a transverse elastic modulus of the second elastic member.

10. The seal assembly according to claim 1, wherein the first elastic member is positioned to face the internal side of the wheel bearing assembly, and wherein the second elastic member is positioned to face the external side of the wheel bearing assembly.

11. The seal assembly according to claim 10, wherein a wire diameter of the first elastic member is thinner than a wire diameter of the second elastic member.

12. The seal assembly according to claim 10, wherein an external diameter of the first elastic member is greater than an external diameter of the second elastic member.

13. The seal assembly according to claim 10, wherein a number of turns of coil in the first elastic member is greater than a number of turns of coil in the second elastic member.

14. The seal assembly according to claim 1, wherein the deformation unit further includes first and second dust covers covering the first elastic member and the second elastic member to prevent a foreign object from entering the first elastic member and the second elastic member.

15. The seal assembly according to claim 14, wherein the first dust cover includes a pair of first grooves formed in top and bottom end portions of the first dust cover, respectively, and the slinger includes a pair of first protrusions corresponding to the pair of first grooves, and wherein the pair of first grooves is fitted to the pair of first protrusions, respectively.

16. The seal assembly according to claim 14, wherein the second dust cover includes a pair of second grooves formed on top and bottom end portions of the second dust cover, respectively, and the slinger includes a pair of second protrusions corresponding to the pair of second grooves, and wherein the pair of second grooves is fitted to the pair of second protrusions, respectively.

* * * * *